(12) United States Patent
Jabr

(10) Patent No.: US 8,036,118 B2
(45) Date of Patent: Oct. 11, 2011

(54) INDUCING SYMMETRY VIA MULTI TOPOLOGY ROUTING

(75) Inventor: Khalil Jabr, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 209 days.

(21) Appl. No.: 12/024,779

(22) Filed: Feb. 1, 2008

(65) Prior Publication Data

US 2009/0196297 A1    Aug. 6, 2009

(51) Int. Cl.
*H04L 12/28* (2006.01)
(52) U.S. Cl. .................. 370/230.1; 370/254; 370/395.3
(58) Field of Classification Search .................. None
See application file for complete search history.

(56) References Cited

U.S. PATENT DOCUMENTS

| | | | |
|---|---|---|---|
| 6,697,329 B1* | 2/2004 | McAllister et al. | 370/235 |
| 2003/0108052 A1* | 6/2003 | Inoue et al. | 370/399 |
| 2003/0206638 A1* | 11/2003 | Xu et al. | 380/281 |
| 2006/0206706 A1* | 9/2006 | Dietz | 713/154 |
| 2008/0205376 A1* | 8/2008 | Patmon et al. | 370/351 |
| 2009/0052321 A1* | 2/2009 | Kamath | 370/235 |

* cited by examiner

*Primary Examiner* — Chirag Shah
*Assistant Examiner* — Salvador E Rivas
(74) *Attorney, Agent, or Firm* — Patterson & Sheridan, LLP

(57) ABSTRACT

In one embodiment, a technique for selecting a topology, in a multi-topology routing network, based on a source-destination pair of a packet is provided. The packet may be routed on a preferred path of the selected topology. By selecting the same topology for the source-destination pair even if the source and destination addresses are swapped, upstream and downstream traffic may be routed in a symmetrical manner. For some embodiments, a topology may be selected using a hash value that is generated using an algorithm that is commutative with respect to the source and destination addresses.

22 Claims, 12 Drawing Sheets

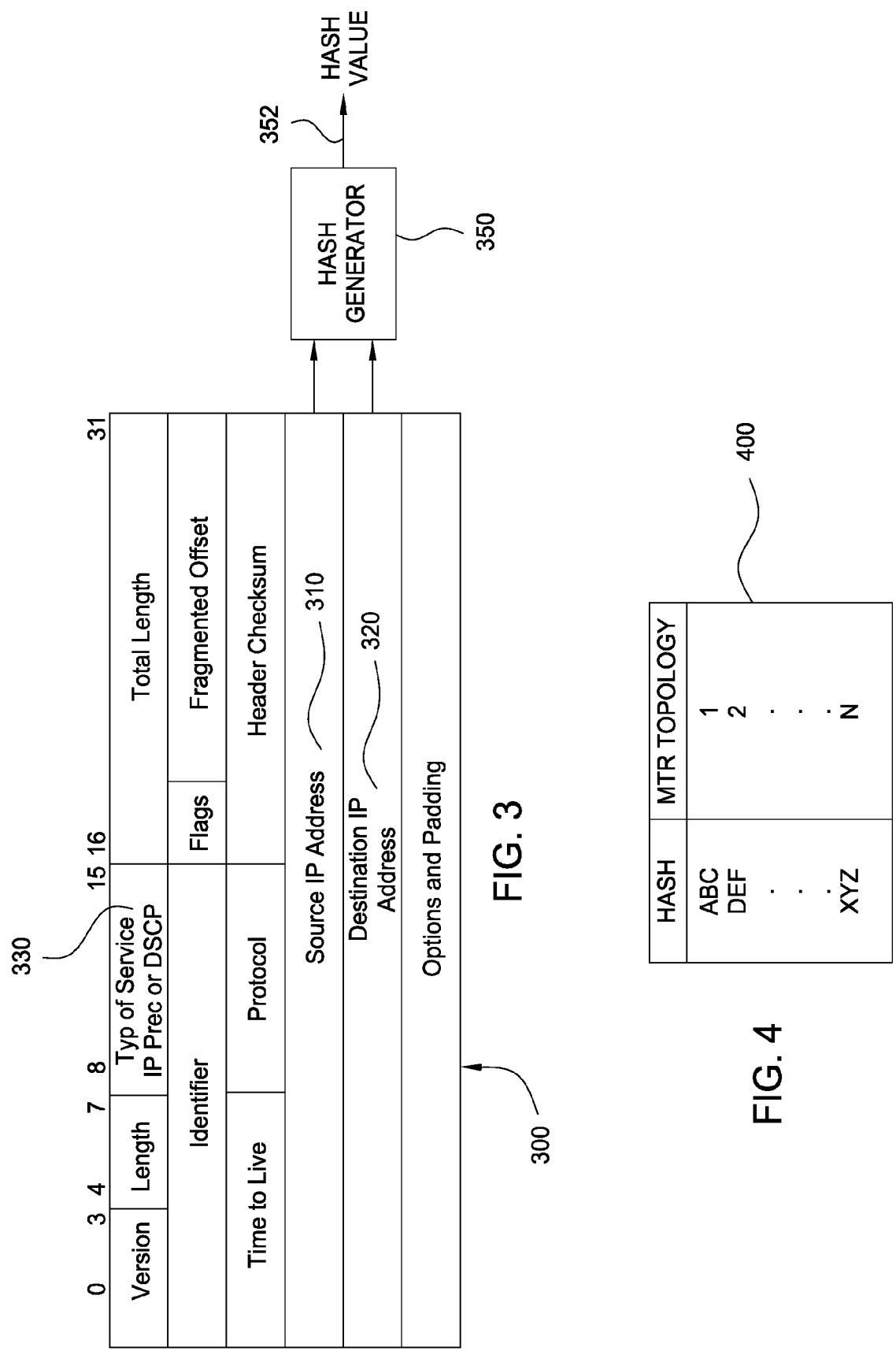

INDUCING SYMMETRY VIA MULTI TOPOLOGY ROUTING

TECHNICAL FIELD

The present disclosure relates generally to networking and more particularly, to routing network traffic.

BACKGROUND

Computing networks typically incorporate a variety of hardware elements at a local entity locally such as switches, firewalls and routers, as well as a plurality of hardware and firmware elements provided by various internet service providers (ISPs). It may be desirable in certain cases to control the flow of traffic, for example, ensuring certain types of network traffic is routed along a particular path.

One approach to control network traffic is known as Multi-Topology Routing (MTR). The MTR allows a set of virtual network topologies to be formed, with each topology having preferred paths. Preferred paths are established by assigning different costs to a network link for each topology. Traditionally, a topology is selected for routing packets based on a differentiated services code point (DSCP) bits included in a packet header.

Unfortunately, the use of DSCP bits for topology selection imposes some limits on the type of control over the path that a specific class of traffic can traverse.

Overview

One embodiment provides a method generally including receiving a first packet having a source address and destination address, selecting, from a set of multi-topology routing topologies, a topology as a function of the source address and the destination address, and sending the first packet on a path preferred by the selected topology.

One embodiment provides an apparatus, generally including logic for receiving a first packet having a source address and destination address, logic for selecting, from a set of multi-topology routing topologies, a topology based on the source address and destination address, and logic for sending the packet on a path preferred by the selected topology.

One embodiment provides an apparatus, generally including a first interface for sending packets to a first device on a preferred path of a first multi-topology routing (MTR) topology, a second interface for sending packets to a second device on a preferred path of a second MTR topology, and a routing component. The routing component is generally configured to receive a first packet having a source address and destination address, select, from a set of multi-topology routing topologies including at least the first and second topologies, a topology as a function of the source address and the destination address, and send the first packet on a path preferred by the selected topology.

One embodiment provides an apparatus generally including means for receiving a first packet having a source address and destination address, means for selecting, from a set of multi-topology routing topologies, a topology based on the source address and destination address, and means for sending the packet on a path preferred by the selected topology.

BRIEF DESCRIPTION OF THE DRAWINGS

So that features of the present disclosure can be understood in detail, a particular description of the disclosure may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 illustrates example logic for generating a hash value based on a source-destination address pair, according to one embodiment of the disclosure.

FIG. 4 illustrates an example table for selection of an MTR topology based on a hash value, according to one embodiment of the disclosure.

DESCRIPTION OF EXAMPLE EMBODIMENTS

Embodiments of the present disclosure provide techniques for routing network traffic in networks represented by logical topologies, such as Multi-Topology routing (MTR) networks. In MTR, distinct logical topologies are defined by assigning different costs to network paths. The present disclosure presents a technique that allows the same topology to be selected for outbound and return traffic, providing some level of bi-directional symmetry, meaning traffic in both directions may be routed through the same network components.

For some embodiments, the same topology may be selected for traffic in both directions by selecting a topology based on a source-destination pair. In other words, because the source and destination of the return traffic will be the same as the destination and source, making a selection based on the source-destination pair may result in the same selection for the outbound and return packets. As will be described below, a selection value (e.g., a hash value) may be generated as a function of the source and destination. The algorithm to generate the selection value may be designed to ensure that the same selection value is generated regardless of the order of the source and destination address (e.g., the selection algorithm may be commutative).

Selecting a topology based on the source-destination pair may help induce symmetry which may help accommodate stateful firewalls and IPS/IDS devices. Such devices often track packets from a given source and expect response packets in a particular sequence or time period. Such devices expect traffic to be routed symmetrically, along the same path, and may block response traffic that is routed along a different path than expected.

Selecting a topology based on a source-destination pair may help ensure an expected path through such devices is used. In other words, each topology may have a single "preferred" path through a stateful device that is the same for both upstream and downstream traffic between the same devices. Selecting a topology based on the source-destination pair may also help improve load-balancing by more evenly distributing network traffic among topologies.

Example Network Topology

Figure 1:
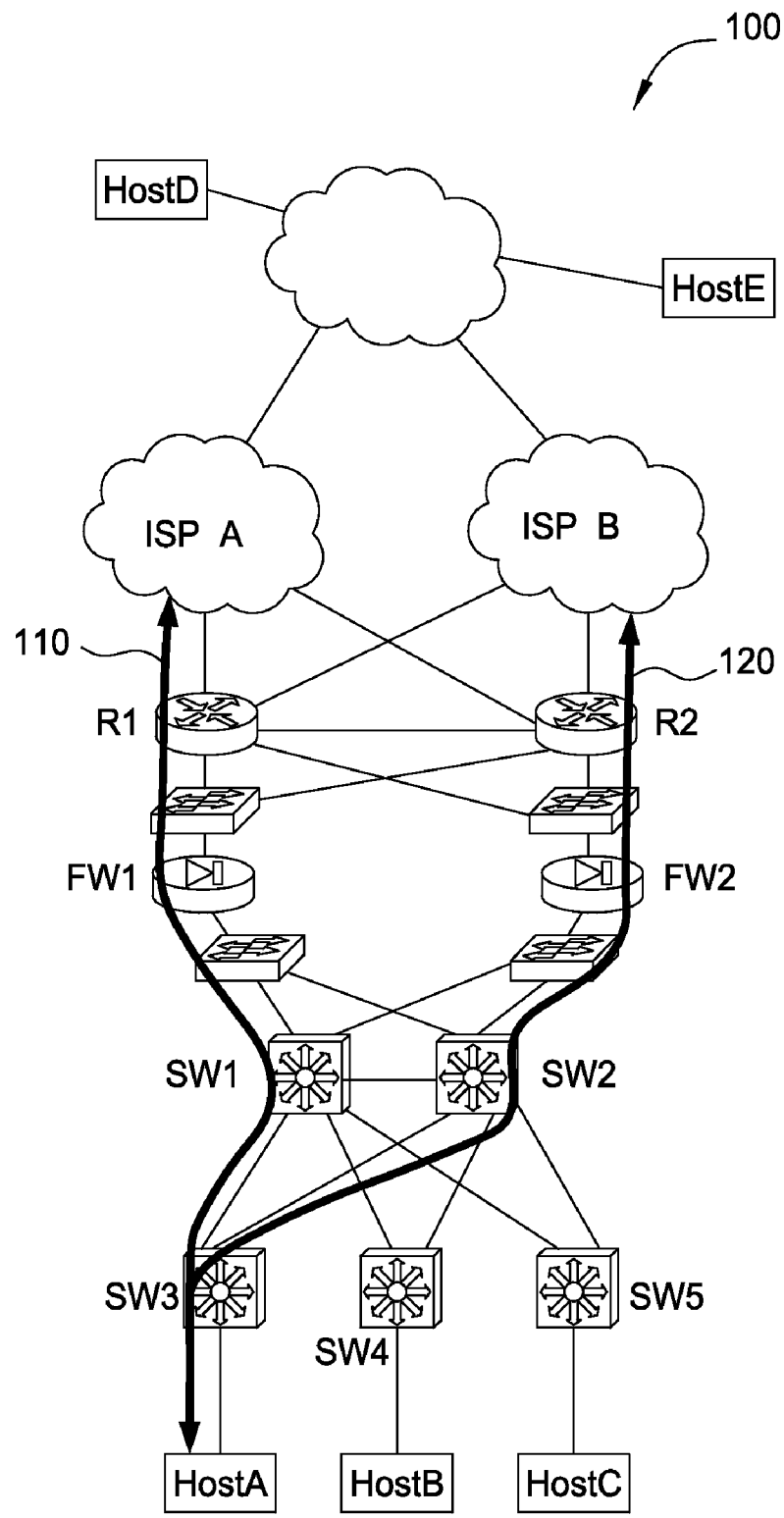
FIG. 1 illustrates an example multi topology routing (MTR) network network, according to one embodiment of the disclosure.

FIG. 1 illustrates an example network 100 in which embodiments of the present disclosure may be utilized. The network 100 allows the exchange of network traffic between a set of local hosts (Hosts A, B, and C) and a set of remote hosts (Hosts D and E), illustratively via a pair Internet Service Provider networks (ISPs A and B). A set of switches (SW1 and SW2), firewalls (FW1 and FW2) and routers (R1 and R2) connect the local host devices to the ISPs.

Multiple topology routing (MTR) may be running on the devices between the local hosts and the ISPs. Multiple virtual topologies may be established, with some or all links between the devices available to each topology. However, via link costing, the topologies may have different preferred paths to the ISP networks.

As an example, FIG. 1 assumes two virtual topologies, Topology 1 and Topology 2. As illustrated, Topology 1 may have a first preferred route 110 through FW1, while Topology 2 may have a second preferred route 120 through FW2. The preferred paths may be established by link costing. Devices running MTR may take these separate costs into consideration when making routing table entries for the separate virtual topologies.

In some embodiments, each piece of local hardware may generate and maintain a table which contains the costs of each available link. In some embodiments a given piece of local hardware may be part of a plurality of different topologies. To enable the piece of local hardware to route a given packet along the preferred path of the selected topology, the table may contain entries where a specific link has a different associated cost depending on which topology is employed. Since the tables in the local hardware are maintained, if a piece of local hardware in a given topology is unavailable the cost of the corresponding links may be updated to yield an alternate path for that topology. This may allow for uninterrupted operations during link or component failures.

Topology Selection

Network traffic may be distributed among the different virtual topologies via a topology selection technique. As described above, a topology may be selected based on a source and destination address pair. By generating a hash value as a function of the source and destination address pair, regardless of their order, the same topology may be selected for traffic in both directions. As a result, upstream and downstream traffic may use symmetrical paths, which may benefit certain devices, such as firewalls or intrusion prevention systems (IPS).

Figure 2:
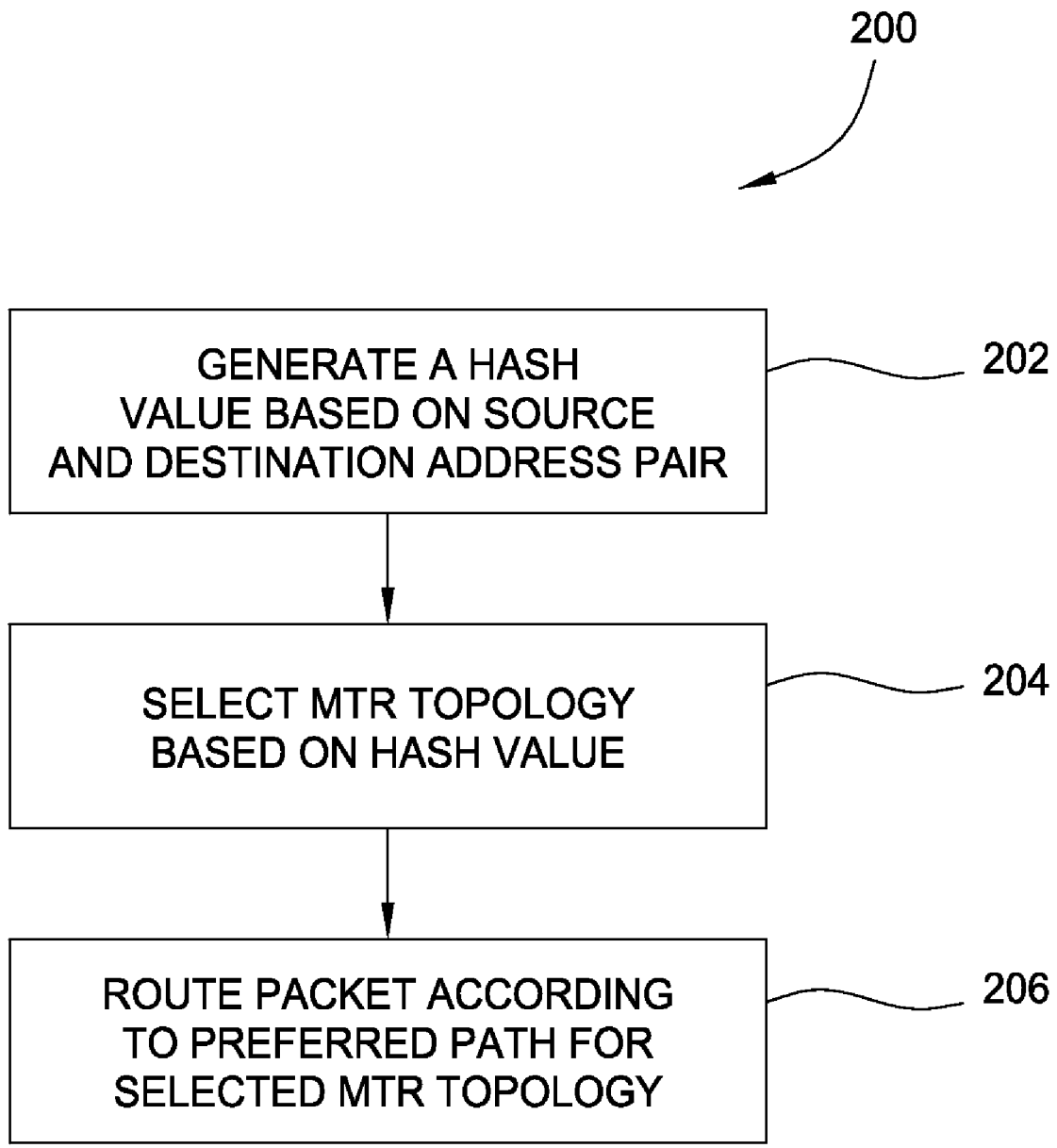
FIG. 2 is a flowchart of example operations, according to one embodiment of the disclosure.

FIG. 2 illustrates example operations 200 for selecting a topology based on a source-destination address pair. The operations may be performed, for example, by any network device running MTR in order to route network traffic using the virtual topologies.

The operations begin, at 202, with the generation of a hash value based on a source address and destination address of a packet. At step 204, a topology is selected based on the hash value. At step 206, the packet is routed according to the selected topology.

FIG. 3 illustrates a logic diagram of a hash generator 350, which may be implemented in hardware, software, or any combination thereof. As illustrated, the hash generator 350 may generate a hash value 352 based on a source address 310 and destination address 320 of an IP packet header 300.

For some embodiments, the hash generator may be configured to generate the hash value 352 according to an algorithm that is commutative with respect to the source and destination address. As a result, the hash generator may generate the same hash value regardless of the order of the source and destination addresses. For example, the hash generator 350 may generate the same hash value 352 for an upstream packet having a source address of Host A and destination address of Host D as for a return packet having the source address of Host D and destination address of Host A. Vary either the source or destination address, however, and the hash generator 350 may generate a different hash value 352.

The hash generator 350 may implement any suitable algorithm to generate a set of hash values based on different source-destination address pairs. While there may be a virtually unlimited number of unique source-destination pairs presented at any network device, the hash generator 350 may generate only a limited number of unique hash values, with the actual number of different hash values depending, for example, on the number of virtual topologies to be supported. Therefore, different source-destination pairs may result in the same hash value, such that packets are distributed among the different topologies.

As an alternative, a generated hash value may be truncated in some manner for topology selection, such that different source-destination pairs still result in the same topology being selected. As an example, only a portion of the hash value, such as a limited number of least significant bits (LSBs) may be used for topology selection. In either case, the hash value generation and/or topology selection may be designed to evenly distribute network traffic across the different topologies, for example, in an effort to balance the load on different network paths.

As illustrated in FIG. 4, a look-up table 400 may be implemented to facilitate the MTR topology selection based on a generated hash value. In some embodiments, a plurality of hash values may result in the selection of the same MTR topology; however, typically, only one MTR topology may be selected based on a given hash value. For some embodiments, some other type of selection logic may be used to select a topology based on a hash value.

For some embodiments, some type of selection logic may select a topology based on source-destination address pair directly, for example, without explicitly generating a hash value. As an example, a "two-dimensional" lookup table may be implemented to select a topology, with the same topology being selected for a source-destination address pair.

FIGS. 5A-D illustrate packet routing utilizing MTR and topology selection in accordance with embodiments of the present disclosure. The example illustrates an exchange of packets between Host A and Host D, beginning with a packet 500 sent from Host A.

Figure 5A:
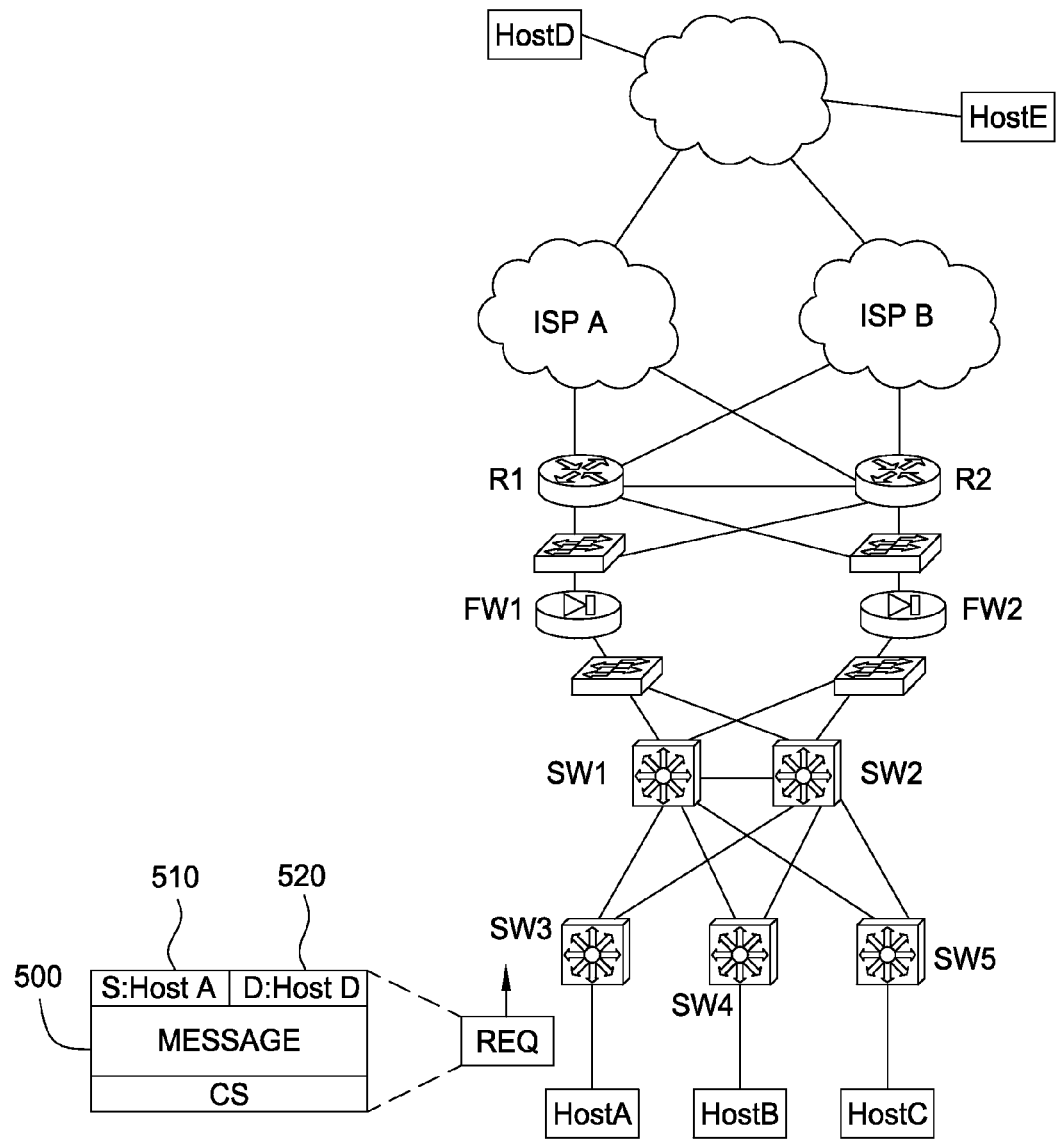
FIGS. 5A-5D illustrate an example of traffic flow controlled by MTR routing, according to one embodiment of the disclosure.

As illustrated in FIG. 5A, the packet 500 has a header that contains a source IP address 510 for Host A and a destination IP address 520 for Host D. For this example, Topology 1 having a preferred path 110 through FW1 is selected for the source-destination address pair A-D.

Figure 5B:
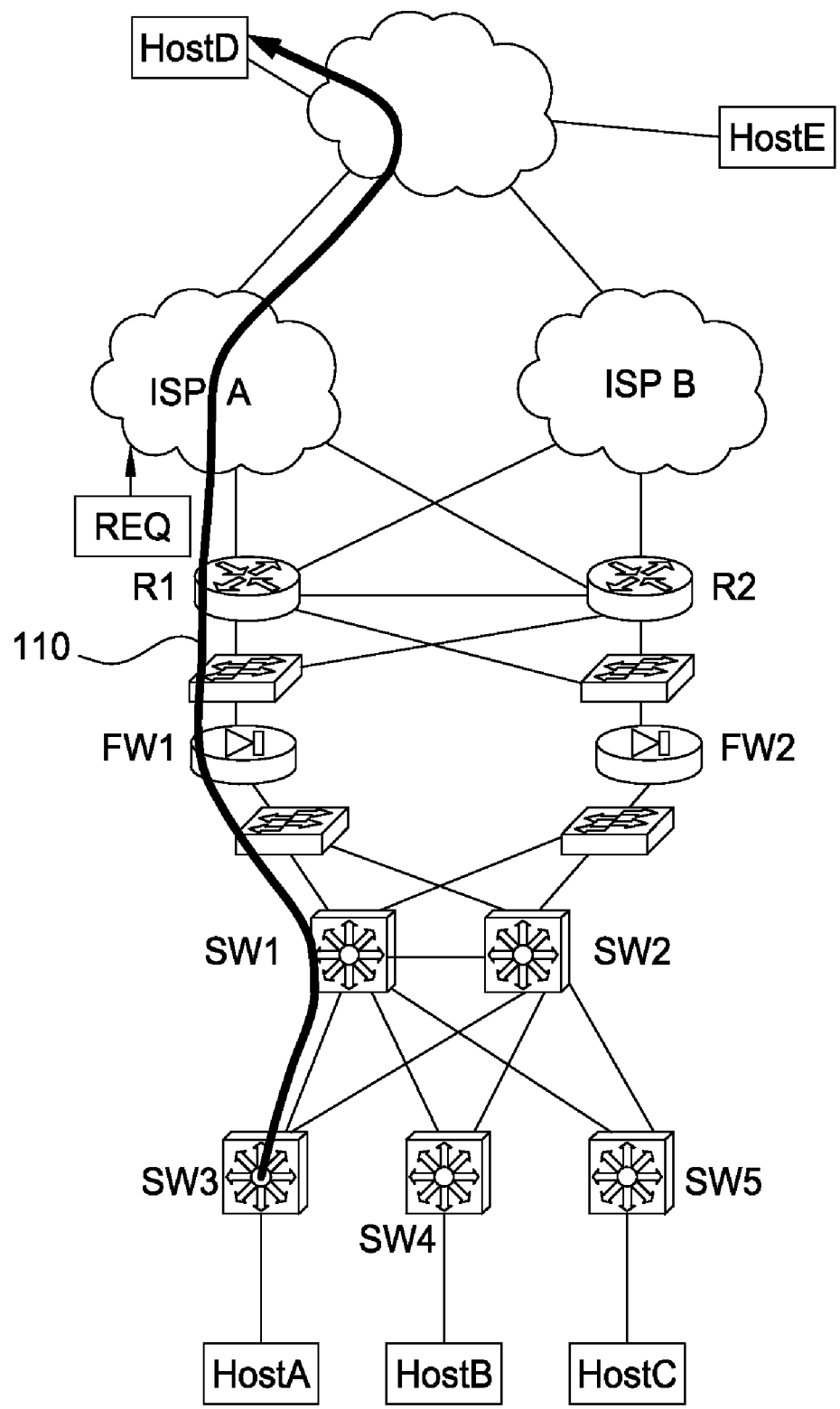

Therefore, as illustrated in FIG. 5B, the packet is routed to Host D through the preferred path 110. After passing through the last local router R1, the packet may no longer be routed according to MTR. In other words, the topology may not have any effect on how the packet 500 of FIG. 5A is routed through the ISP to Host D. However, a response packet may be again routed according to the MTR once it enters the local network, with the same topology selected because it will have the same source-destination pair.

Figure 5C:
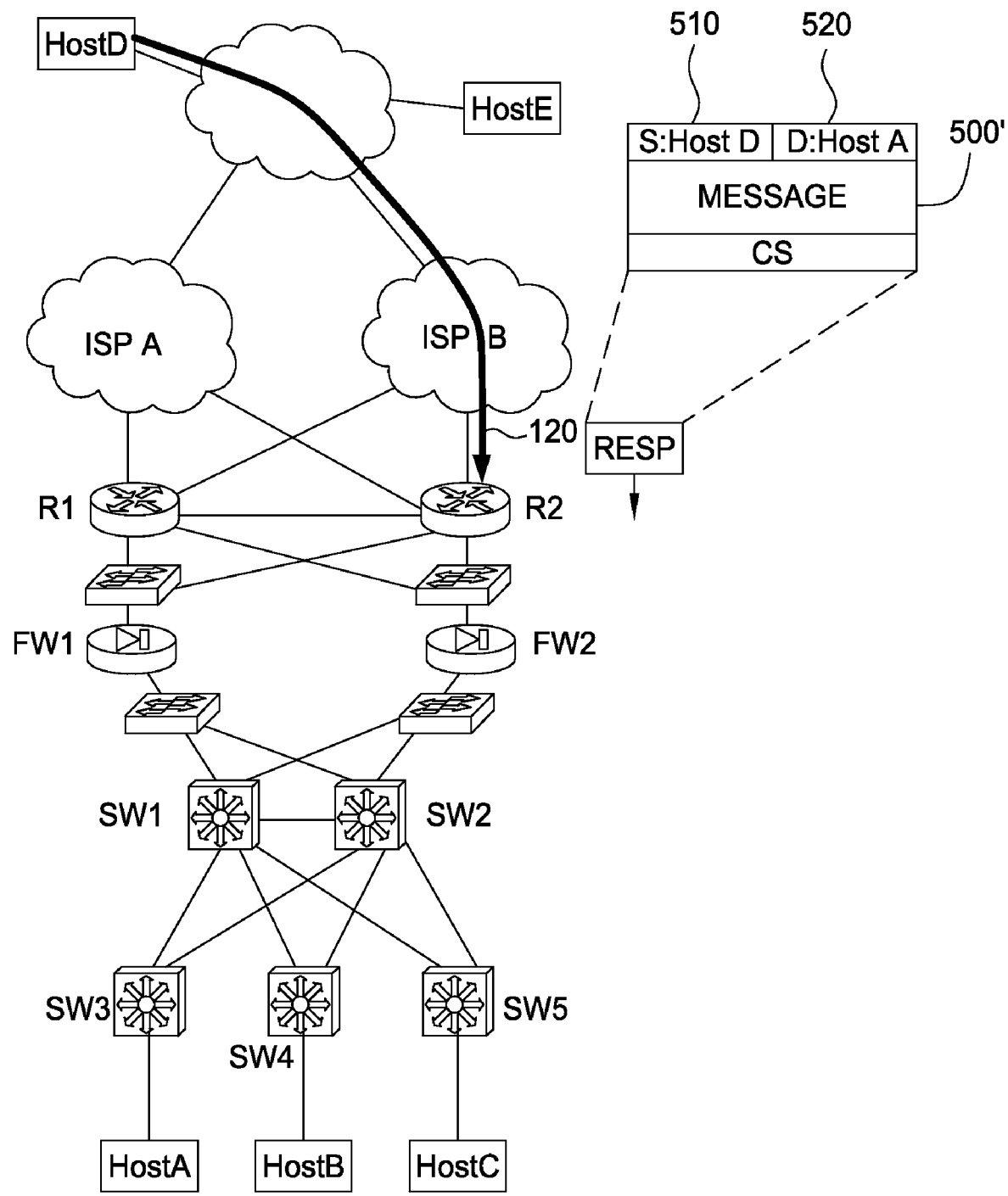

For example, FIG. 5C illustrates a response packet 500′ having a source address 510 for Host D and a destination address 520 for Host A. Because this source-destination address pair is the same as the original packet 500 of FIG. 5A, the response packet 500′ will be routed back through the local network according to topology 1, even if the response packet 500′ is routed through a different path than the original packet

500 of FIG. 5A. As illustrated, the response packet 500' comes back through a different router, to R2 from ISP B.

Figure 5D:
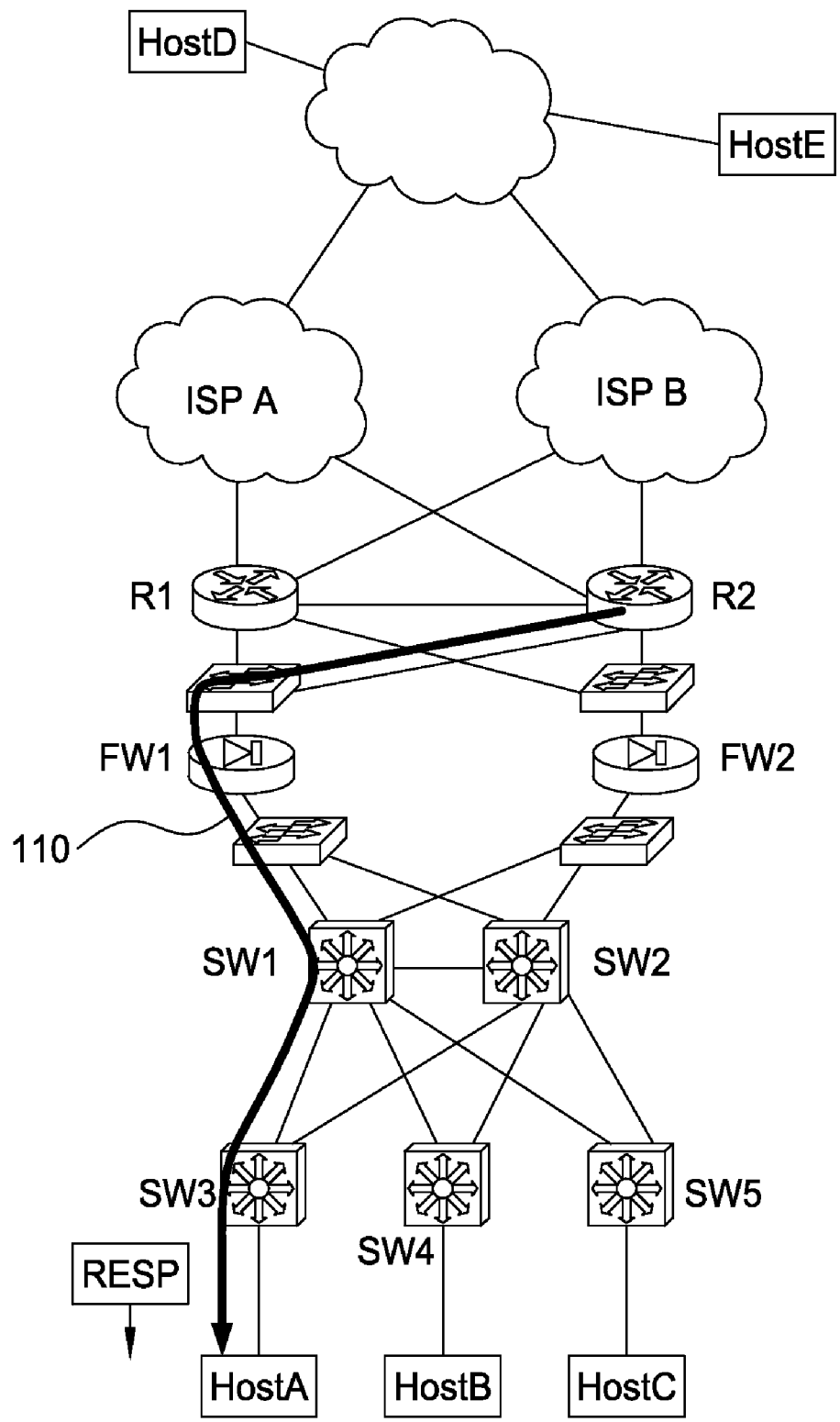

As illustrated in FIG. 5D, R2 may still select topology 1 based on the source destination pair, and route the response packet 500' of FIG. 5B using the preferred path through FW1. As illustrated, R2 forwards the response packet 500' of FIG. 5B to FW1 which then forwards it to SW1, then to SW3 and, finally, to Host A.

Figure 6A:
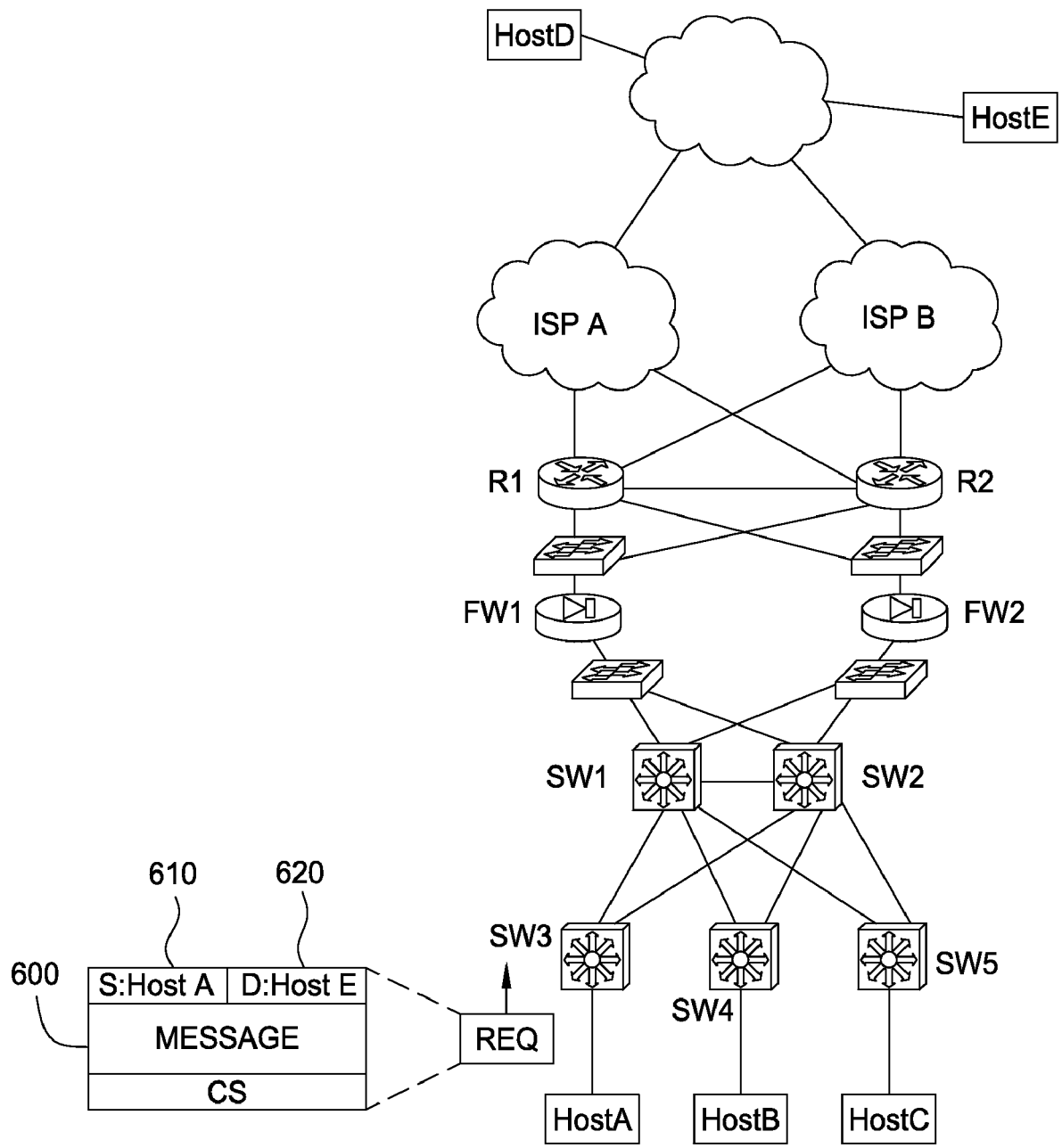
FIGS. 6A-6D illustrate another example of traffic flow controlled by MTR routing, according to one embodiment of the disclosure.

FIGS. 6A-D illustrate another example of packet routing utilizing MTR and topology selection, with an exchange of packets between Host A and Host E. As illustrated in FIG. 6A, the exchange begins with a packet 600 sent from Host A, with a header that contains a source address 610 for Host A and a destination address 620 for Host E.

Figure 6B:
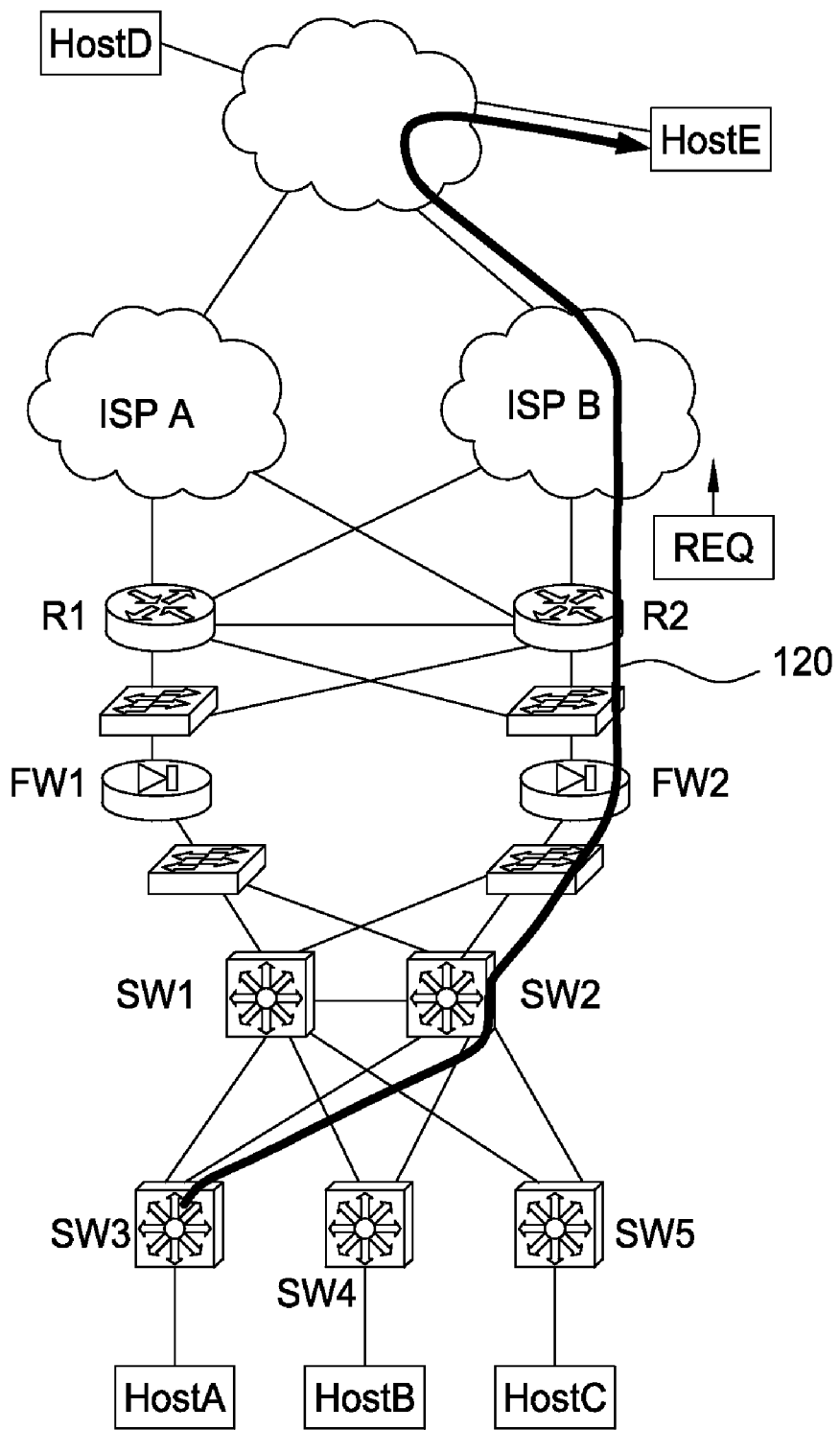

For this example, Topology 2 having a preferred path 120 through FW2 is selected for the source-destination address pair A-E. Therefore, as illustrated in FIG. 6B, the packet 600 of FIG. 6A is routed to Host E through the preferred path 120.

Figure 6C:
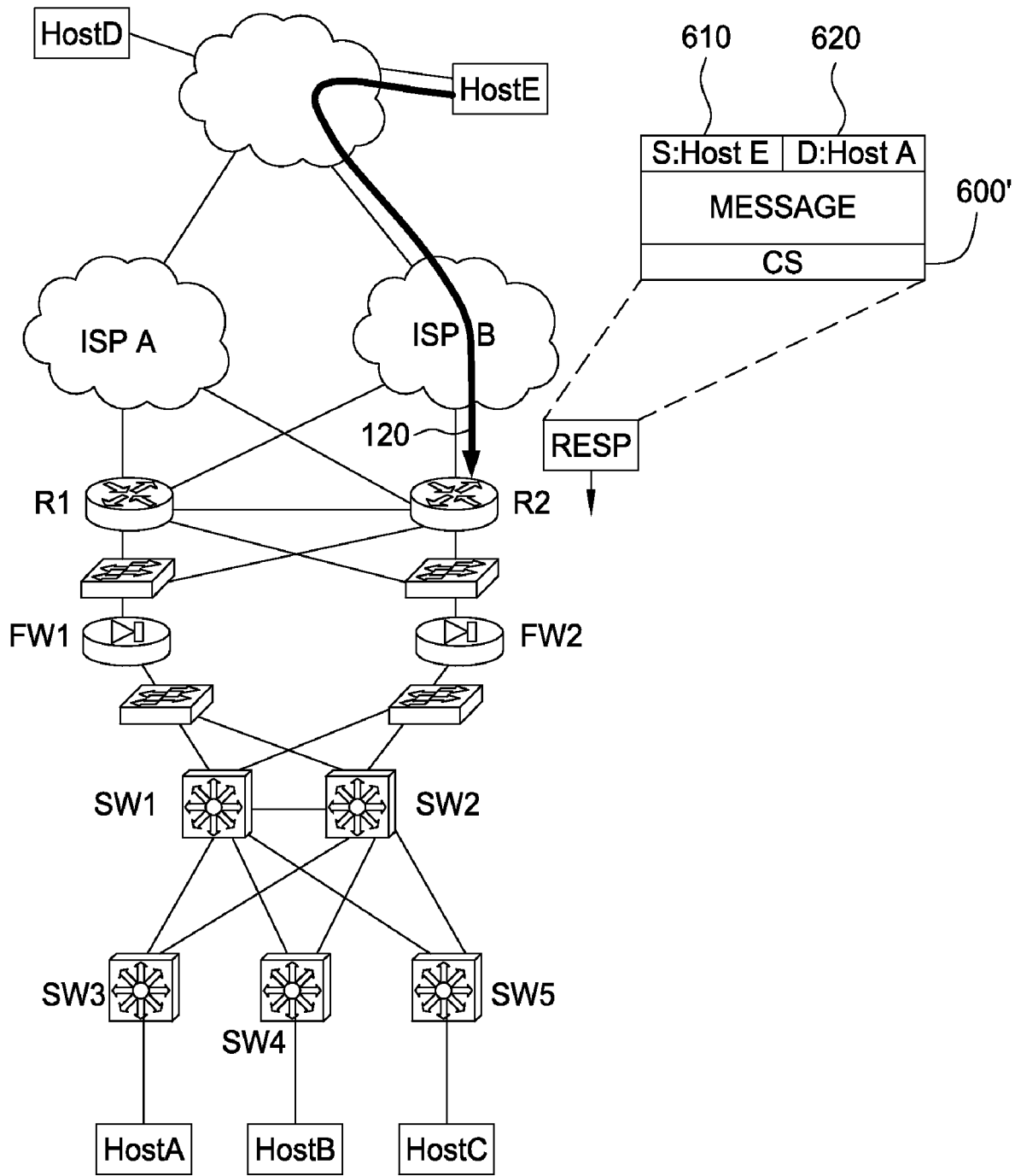
Figure 6D:
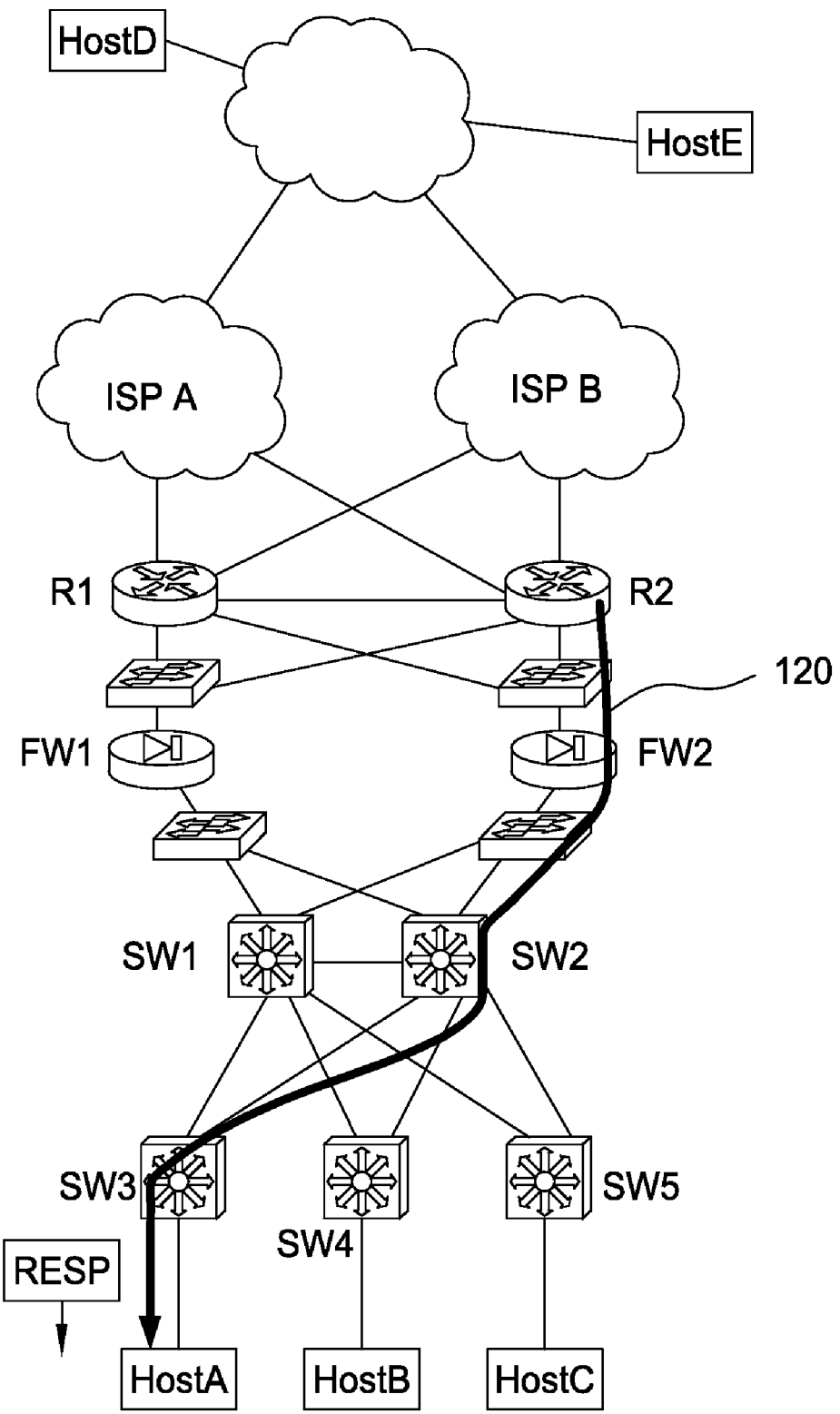

As illustrated in FIG. 6C, a response packet 600' may be routed according to the same topology because it will have the same source-destination pair. As illustrated in FIG. 6D, the response packet 600' of FIG. 6C will be routed back through the local network according to the preferred path 120 of topology 2, through FW2. As illustrated, R2 forwards the response packet 600' of FIG. 6C to FW2 which then forwards it to SW2, then to SW3 and, finally, to Host A.

Figure 7:
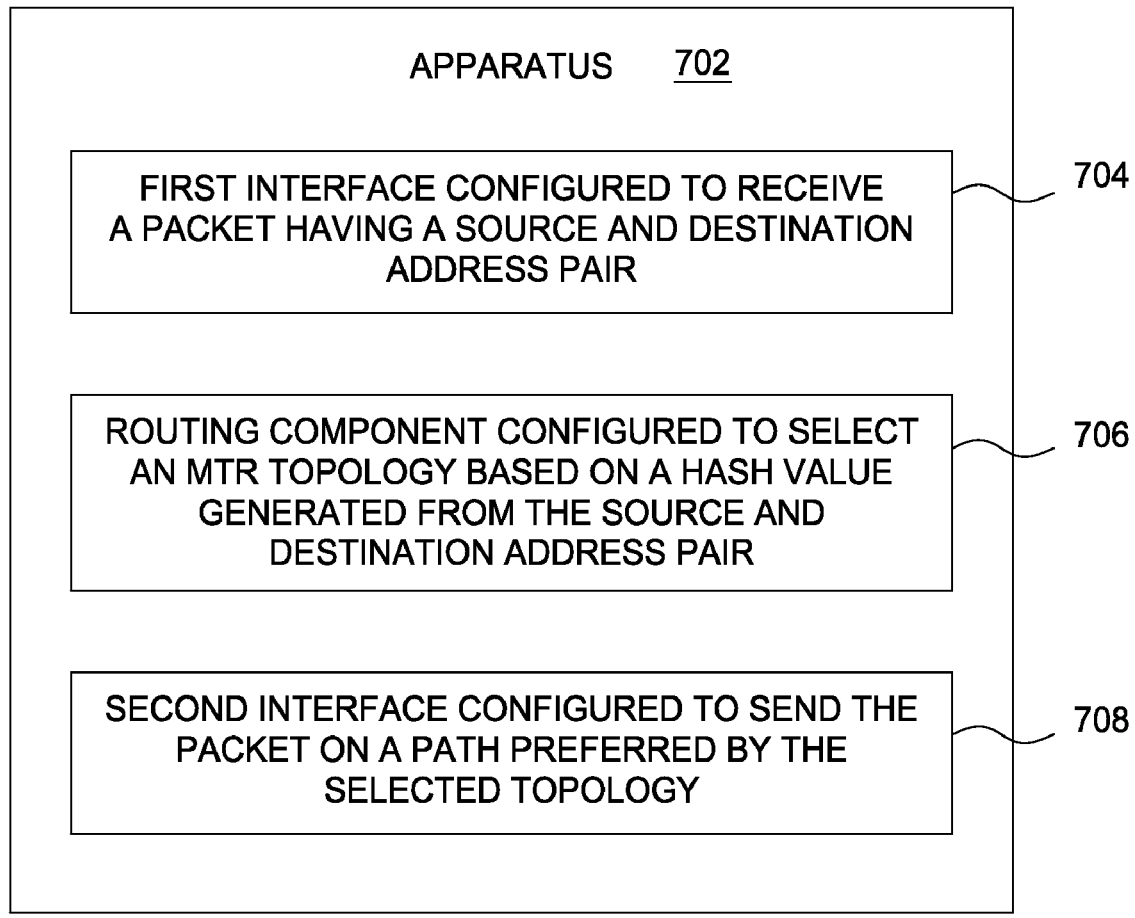
FIG. 7 is a block diagram illustrating components of an apparatus for selecting an MTR topology, according to an exemplary embodiment present in this disclosure.

FIG. 7 is a block diagram illustrating components 700 of an apparatus for selecting an MTR topology, according to an exemplary embodiment presented in this disclosure. As shown, the apparatus includes a first interface 704, a routing component 706, and a second interface 708. The first interface 704 is configured to receive a packet having a source and destination address pair. The routing component 706 is configured to select an MTR topology based on a hash value generated from the source and destination address pair. In some embodiments, the routing component 706 may also be configured to generate the hash value from the source and destination address pair. Additionally or alternatively, the routing component 706 may also be configured to determine a path that is preferred by the selected topology. The second interface 710 is configured to send the packet on the path preferred by the selected topology.

Load Balancing, Redundancy and Interoperability

By selecting a topology based on a source-destination pair as described herein, traffic between two devices may be controlled on predictable, consistent paths through stateful devices that are symmetrical for upstream and downstream traffic.

In addition, an algorithm that selects topology based on a source and destination pair may also result in better load balancing, when compared with conventional techniques that select topologies based on DSCP bits. For example, there are a virtually unlimited number of source destination pairs, while there are only a limited number of DSCP bits. As a result, not only can a greater number of topologies be selected, but the traffic may be more evenly distributed among the topologies.

The technique presented herein also supports redundancy, while allowing multiple firewalls to be active. For example, while each topology may have a preferred path through a given firewall, in the event of a firewall failure, a non-preferred path may be used to route traffic through a non-failing firewall. In the event a firewall (or other device) fails, a protocol such as IGP may remove the path from the routing tables.

It should be noted that not all of the network devices need to support source-destination based topology selection presented herein, or even a conventional MTR that selects topology with DSCP bits for that matter. It may be sufficient for only one or more devices to implement MTR and the source-destination based topology selection presented herein. In other words, devices implementing the techniques presented herein may be interoperable with devices that do not implement the technique.

Embodiments of the present application have been described with reference to firewalls, as a specific, but not limiting example of a stateful device that might benefit from symmetrical traffic as may be gained using MTR topology selection based on source-destination pairs. Those skilled in the art will recognize that other types of devices may also benefit, such as some type of intrusion prevention system (IPS) or intrusion detection system (IDS), which may also be stateful.

While the foregoing is directed to embodiments of the present disclosure, other and further embodiments of the disclosure may be devised without departing from the basic scope thereof, and the scope thereof is determined by the claims that follow.

The invention claimed is:

1. A method comprising:
  receiving a first packet having a source address and destination address;
  from a set of predetermined multi-topology routing topologies formed over a network providing multiple paths between the source address and the destination address, selecting a topology as a function of the source address and the destination address, wherein at least one path provided by the network is common to at least two of the multi-topology routing topologies and is assigned a first cost in a first one of the multi-topology routing topologies and is assigned a second cost in a second one of the multi-topology routing topologies, the second cost being different from the first cost, each of the first cost and the second cost characterizing the at least one path in terms of a predefined metric associated with the respective multi-topology routing topology, each predefined metric being distinct, wherein the at least one path comprises one or more network links;
  subsequent to selecting the topology, selecting a path of the multiple paths provided by the network, based on the cost assigned to each of the multiple paths by the selected topology; and
  sending the first packet on the selected path that is preferred by the selected topology.

2. An apparatus, comprising:
  a first interface for receiving a first packet having a source address and destination address;
  a routing component for selecting, by operation of one or more computer processors and from a set of predetermined multi-topology routing topologies formed over a network providing multiple paths between the source address and the destination address, a topology based on the source address and destination address, wherein at least one path provided by the network is common to at least two of the multi-topology routing topologies and is assigned a first cost in a first one of the multi-topology routing topologies and is assigned a second cost in a second one of the multi-topology routing topologies, the second cost being different from the first cost, each of the first cost and the second cost characterizing the at least one path in terms of a predefined metric associated with the respective multi-topology routing topology, each predefined metric being distinct, wherein the at least one path comprises one or more network links, wherein the routing component is configured to select a path of the multiple paths provided by the network, based on the cost assigned to each of the multiple paths by the selected topology; and
a second interface for sending the packet on the selected path that is preferred by the selected topology.

3. The apparatus of claim 2, wherein the routing component is configured to select the topology according to an algorithm that results in a selection of the same topology if the source address and destination address are swapped.

4. The apparatus of claim 2, wherein the routing component is configured to generate a hash value as a function of the source address and the destination address and selecting the topology as a function of the hash value.

5. The apparatus of claim 4, wherein the routing component is configured to select a topology based on a subset of bits of the hash value.

6. The apparatus of claim 4, further comprising:
a lookup table with entries for topologies, and wherein the routing component is configured to using the hash value as an index into the lookup table.

7. The apparatus of claim 4, wherein the routing component is configured to generate the hash value using an algorithm that is commutative with respect to the source address and destination address.

8. An apparatus, comprising:
a first interface for sending packets to a first device on a preferred path of a first multi-topology routing (MTR) topology;
a second interface for sending packets to a second device on a preferred path of a second MTR topology; and
a routing component configured to:
receive a first packet having a source address and destination address;
select, from a set of predetermined multi-topology routing topologies including at least the first and second topologies, a topology as a function of the source address and the destination address, wherein the set of predetermined multi-topology routing topologies is formed over a network providing multiple paths between the source address and the destination address, wherein at least one path provided by the network is common to at least two of the multi-topology routing topologies and is assigned a first cost in a first one of the multi-topology routing topologies and is assigned a second cost in a second one of the multi-topology routing topologies, the second cost being different from the first cost, each of the first cost and the second cost characterizing the at least one path in terms of a predefined metric associated with the respective multi-topology routing topology, each predefined metric being distinct, wherein the at least one path comprises one or more network links;
select a path of the multiple paths provided by the network, based on the cost assigned to each of the multiple paths by the selected topology; and
send the first packet on the selected path that is preferred by the selected topology.

9. The apparatus of claim 8, wherein at least one of the first and second devices is also configured to receive a first packet having a source address and destination address, select, from a set of multi-topology routing topologies including at least the first and second topologies, a topology as a function of the source address and the destination address, and send the first packet on a path preferred by the selected topology.

10. The apparatus of claim 8, wherein at least one of the first and second devices is a firewall.

11. The apparatus of claim 8, wherein at least one of the first and second devices is an intrusion prevention device.

12. The apparatus of claim 8, wherein the routing component is configured to select a topology as a function of the source address and the destination address by generating a hash value as a function of the source and destination address.

13. The apparatus of claim 8, wherein the routing component is configured to generate the hash value using an algorithm that is commutative with respect to the source and destination addresses.

14. The apparatus of claim 13, wherein the routing component is configured to select a topology from a lookup table using the hash value as an index.

15. An apparatus, comprising:
means for receiving a first packet having a source address and destination address;
means for selecting, from a set of predetermined multi-topology routing topologies formed over a network providing multiple paths between the source address and the destination address, a topology based on the source address and destination address, wherein at least one path provided by the network is common to at least two of the multi-topology routing topologies and is assigned a first cost in a first one of the multi-topology routing topologies and is assigned a second cost in a second one of the multi-topology routing topologies, the second cost being different from the first cost, each of the first cost and the second cost characterizing the at least one path in terms of a predefined metric associated with the respective multi-topology routing topology, each predefined metric being distinct, wherein the at least one path comprises one or more network links;
means for selecting a path of the multiple paths provided by the network, based on the cost assigned to each of the multiple paths by the selected topology; and
means for sending the packet on the selected path that is preferred by the selected topology.

16. The apparatus of claim 15, wherein the means for selecting the topology is configured to select the topology according to an algorithm that results in a selection of the same topology if the source address and destination address are swapped.

17. The method of claim 1, wherein each metric comprises at least one of bandwidth, latency, jitter, loss, and congestion.

18. The method of claim 1, further comprising:
receiving a second packet having a source address and destination address with values that are swapped relative to the first packet;
selecting, from the set of multi-topology routing topologies, the topology as a function of the source address and the destination address of the second packet, wherein the same topology is selected as for the first packet; and
sending the second packet on the path preferred by the selected topology.

19. The method of claim 18, wherein the first packet is sent to a first device, wherein the second packet is sent to a second device, wherein at least one of the first device and the second device is configured to expect packets to be routed symmetrically between two addresses.

20. The method of claim 19, wherein the topology is selected according to an algorithm that results in a selection of the same topology even if the source address and destination address are swapped, to prevent at least one of the first packet and the second packet from being blocked by the at least one of the first device and the second device.

21. The method of claim 20, wherein the at least one of the first device and the second device comprises at least one of a stateful firewall, an intrusion prevention system (IPS) device, and an intrusion detection system (IDS) device.

22. The method of claim 1, wherein the one or more network links comprise one or more physical links, and wherein selecting the topology comprises:

generating a hash value as a function of the source address and the destination address; and selecting the topology as a function of the hash value, wherein selecting the topology as a function of the hash value comprises at least one of: (i) selecting a topology based on a subset of bits of the hash value and (ii) using the hash value as an index into a lookup table, wherein the hash value is generated using an algorithm that is commutative with respect to the source address and destination address.

\* \* \* \* \*